(12) United States Patent
Morini et al.

(10) Patent No.: US 6,870,102 B2
(45) Date of Patent: Mar. 22, 2005

(54) DUCT FOR CABLES

(75) Inventors: Giuseppe Morini, Brescia (IT); Rodolfo Fontana, Clivio (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 10/717,495

(22) Filed: Nov. 21, 2003

(65) Prior Publication Data

US 2004/0104035 A1 Jun. 3, 2004

(30) Foreign Application Priority Data

Dec. 2, 2002 (IT) .................................... BG2002A0041

(51) Int. Cl.[7] .................................................. H01B 3/00
(52) U.S. Cl. ...................... 174/68.1; 174/48; 174/68.3; 248/49
(58) Field of Search ...................... 174/48, 68.1, 68.3, 174/95; 138/111; 439/207; 220/3.2, 3.8; 248/49, 68.1; 211/184

(56) References Cited

U.S. PATENT DOCUMENTS 4,765,576 A * 8/1988 Peled ........................... 248/49
5,927,658 A * 7/1999 Gerster ........................ 248/49

FOREIGN PATENT DOCUMENTS

| EP | 0 275 185 A2 | 7/1988 |
| EP | 0 390 668 A1 | 10/1990 |
| EP | 1 206 022 A1 | 5/2002 |
| FR | 2 812 464 A1 | 2/2002 |

* cited by examiner

*Primary Examiner*—Dhiru R. Patel
(74) *Attorney, Agent, or Firm*—Connolly Bove Lodge & Hutz LLP; Larry J. Hume

(57) ABSTRACT

A duct for electrical cables comprises a plurality of filiform elements arranged substantially parallel to one another according to the longitudinal development of the duct. The duct of the invention includes, for at least a portion of its length, a plurality of structural modules, which are arranged in a transverse direction with respect to said filiform elements and are set at a distance from one another in succession according to the longitudinal development of the duct. The supporting modules have a basically U-shaped body that includes a central wall from which there project, on opposites sides with respect to one another, two side walls that are set substantially parallel to one another. On said shaped body coupling means, designed to enable connection with said filiform elements, are arranged.

15 Claims, 3 Drawing Sheets

DUCT FOR CABLES

FIELD OF THE INVENTION

The present invention relates to a duct for cables, in particular to a duct, or raceway, for electrical cables having an improved structure and performance. In particular, the present invention relates to a duct of the wire-mesh type referred to normally in the art by the terms wire-mesh/mesh-cable-tray or mesh-cable-duct, or mesh-cable-trellis.

BACKGROUND OF THE INVENTION

As is known, in many buildings, whether these be for industrial use, or for use in the handicrafts, commercial or residential sectors, for example factories, workshops, hospitals, hotels, tenement blocks, individual dwellings, shops, trading centres, etc., there are currently used in an increasingly extensive way more or less complex wiring systems that enable transmission of different types of signals to the various parts of the building, for example transmission and distribution of electricity, telecommunications, computer systems, various systems for protection and control, and so forth.

In such wiring systems, a basic component that is widely used in the art is represented by the so-called ducts or raceways or wireways, which are assembled one after another so as to form a sort of duct or trough that "carries" the various cables from the sources to the loads according to pre-set paths, and constitutes a compartment that houses the cables, protecting them as much as possible from the external environment.

Currently, according to the uses and the applicational needs, there are available different types of ducts, and amongst these, one of the most widely used is the wire-mesh duct.

In their most essential embodiment, these wire-mesh ducts are made up of a grid of metal wires that can be of two types, namely, a first type of wires arranged according to the longitudinal development of the duct, which constitutes the warp of the grid ("warp wires"); and a second type of wires that are arranged in a transverse direction with respect to the longitudinal wires and constitutes the weft of the grid ("weft wires"). The two types of wires are welded together and form a normally U-shaped channel or trough, which, once the cables have been housed therein, is usually closed with an appropriate cover.

Thanks to this structure, wire-mesh ducts are particularly appreciated both by manufacturers, on account of their relative simplicity and economy of production, and above all by installers. In fact, they present high effectiveness of use, for example in terms of operating flexibility, in that to make connections along the path the various cables may be made to exit from any one of the meshes of the grid, in terms of ease of inspection and identification through the meshes of the grid of the types of cables on which operations may be carried out, in terms of cleanliness of the duct itself, in terms of natural ventilation of the cables, etc.

Notwithstanding this, the intrinsic structure of the above ducts, if on the one hand it is the principal reason for their commercial success, on the other hand, it is at the same time the source of certain critical factors and some not altogether satisfactory technical aspects.

In particular, the extreme essentiality of implementation results in a normally modest structural rigidity and in practice in a reduced mechanical resistance to loading; this clearly limits the dimensions of the duct and the loads that it is able to withstand, which, if they are excessive, could lead to problems of bending or even to deformation. Consequently, either the carrying capacity of the ducts is to be limited, and hence the number of cables used, in particular when the duct is in a position suspended from resting surfaces, such as floors, or else, as is usually the case, it is necessary to resort to the use of appropriate supports or jointing devices, or again particular constructional solutions are adopted that enable improvement of their mechanical performance. In this sense, two examples of possible solutions adopted in the art are described in the patent applications US2001/0009192 and EP1195869.

The above different solutions, albeit valid, in general adversely affect, at least partially, the advantages afforded by such ducts in that the production costs increase on account of the use of additional pieces or of the adoption of particular production processes, and/or the difficulties of installation are increased. It is necessary, in fact, to consider that usually the channels are arranged in positions that are not particularly convenient to reach and in narrow spaces, and hence the use of supports or jointing devices is not always easy.

Another critical factor of wire-mesh ducts of a known type is represented by the fact that the ends of the weft wires are normally exposed and have sharp edges that during positioning may either damage the cables or cause injury to the installers. Furthermore, on account of these sharp edges, the coupling of the ducts with the cover is problematical, and the cover itself may even suffer damage. To overcome these problems different solutions are adopted; for example, the sharp edges are rounded off, or else the ends of the wires are bent back. Other approaches to the problem envisage the adoption of particular constructional solutions, as, for example, described in the European patent application EP0352191, or the coating of the ends of the wires with appropriate protective elements that then favour coupling with the cover, as is, for example, described in the patent application EP1206022. Also these solutions, albeit effective, have, however, adverse repercussions on the costs of production and of laying in place.

Finally, the process of welding between the wires itself, taking into account also the substantial number of junction points, is not altogether satisfactory since it is necessary to resort to welding methods, typically induction welding, which are in themselves critical and entail the use of complex and costly equipment

SUMMARY OF THE INVENTION

A primary task of the present invention is to provide a duct that will enable the drawbacks of the known art to be overcome, and in particular that will enable improved mechanical performance, together with optimized functional performance.

In the context of this task, a purpose of the present invention is to provide a duct for electrical cables which, as compared to the known solutions, may be produced in a simplified way.

Another purpose of the present invention is to provide a duct that will enable simplification of the operations of installation, reducing the components that have to be used during positioning in place.

Yet another purpose of the present invention is to provide a duct the structure of which will be such as to minimize, if not prevent completely, any possible damage to the cables or injury to the installers.

A further purpose of the present invention is to provide a duct that will enable considerable simplification of the steps of installation of the duct itself, for example in terms of useful length required, and will facilitate connections/disconnections between the parts or between a number of different ducts, thus reducing also the time required for positioning in operation.

Not the least important purpose of the present invention is to provide a duct that will present high reliability, relatively ease of fabrication and competitive costs.

This task, as well as the above and other purposes that will appear more clearly from what follows, are achieved by a duct for cables comprising a plurality of filiform metal elements arranged substantially parallel to one another according to the longitudinal development of the duct, wherein said duct comprises, for at least a portion of its length, a plurality of structural modules arranged in a transverse direction with respect to said filiform elements and spaced apart from one another in succession according to the longitudinal development of the duct, said structural modules having a basically U-shaped body that comprises a central wall from which there project, on opposites sides with respect to one another, two side walls set substantially parallel to one another, coupling means designed to enable connection with said filiform elements being arranged on said shaped body.

In practice, in the duct for cables according to the invention, the supporting modules constitute the structural skeleton that will support the mechanical stresses, with the filiform elements that contribute to defining and delimiting the boundary of the internal space in which the cables are to be housed. In this way, the supporting modules, which in practice replace the weft wires of known ducts, enable as a whole improved mechanical performance to be obtained, at the same time maintaining a configuration in which the functional performance, for example flexibility of the applications, ease of inspection and intervention, will remain optimal. For the purpose of the present invention the terms duct for cables and raceway are used indifferently.

BRIEF DESCRIPTION OF THE DRAWINGS

Further characteristics and advantages will emerge more clearly from the description of preferred, but not exclusive, embodiments of the duct according to the invention, illustrated purely by way of indicative and non-limiting example in the annexed drawings, in which.

DESCRIPTION OF THE PREFERRED EMBODIMENTS

Figure 1:
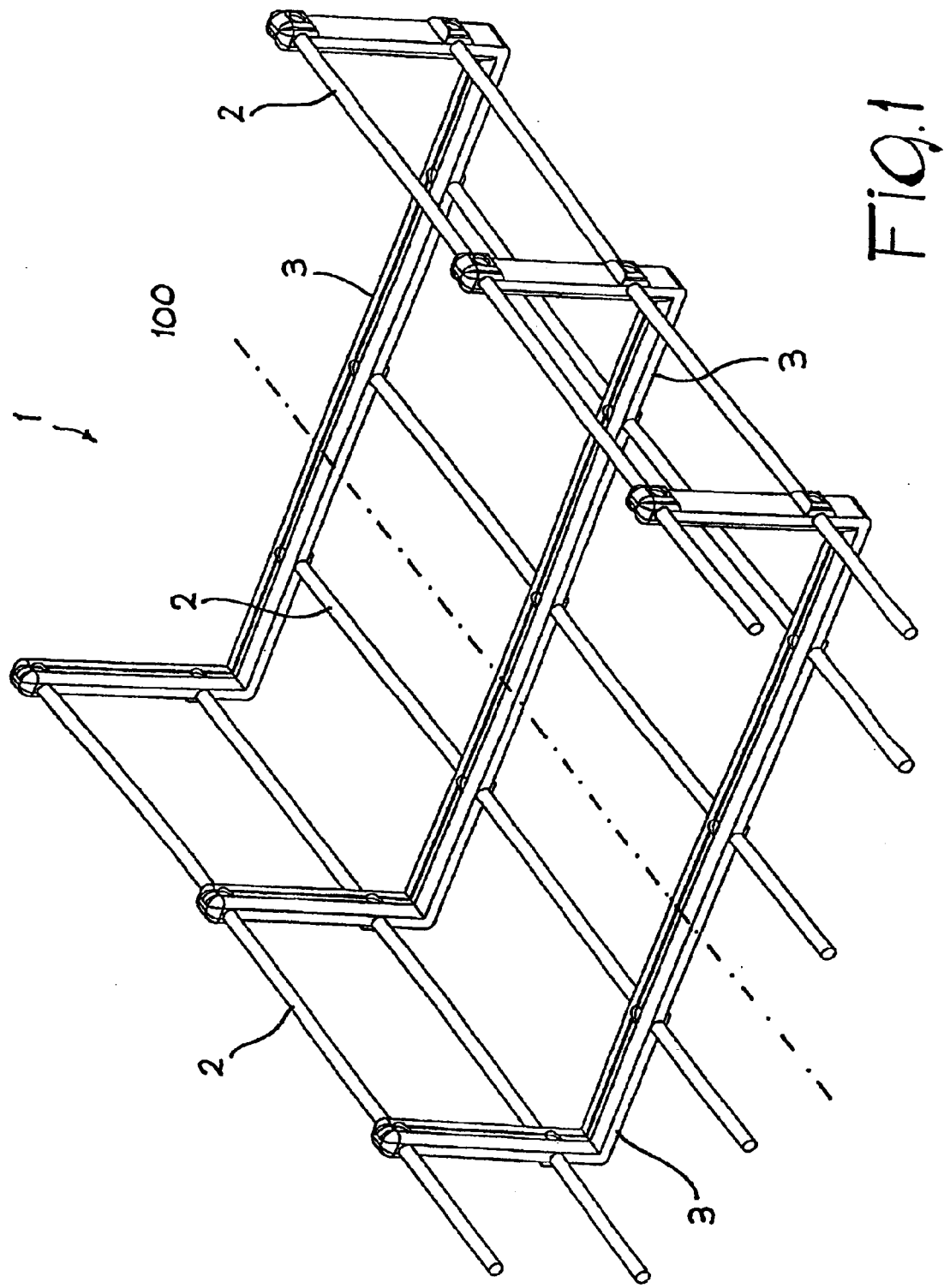
FIG. 1 is a perspective view illustrating a longitudinal stretch of a duct according to the invention.

With reference to the figures referred to above, the duct for cables according to the invention, defined as a whole by the reference number 1, comprises a plurality of filiform metal elements 2 arranged substantially parallel to one another, which extend, in a rectilinear or quasi-rectilinear way, in the direction of longitudinal development of the duct, designated in FIG. 1 by the reference axis 100. In the embodiment illustrated in FIG. 1, the filiform elements 2 are constituted generally by metal wire with circular cross section; alternatively, and in an altogether equivalent way, the filiform elements 2 could be made with a different cross section, for example square, rectangular, or still other shapes provided that they are compatible with the application.

Advantageously, the duct for cables 1 comprises, for at least a portion of its development in length, a plurality of structural modules 3, operatively associated to the, filiform elements 2 according to the modalities which will emerge in greater detail from the ensuing description, the said structural modules 3 being arranged in a transverse direction with respect to the filiform elements 2 and being positioned at a distance from one another in succession in the longitudinal direction of the reference axis 100.

Figure 2:
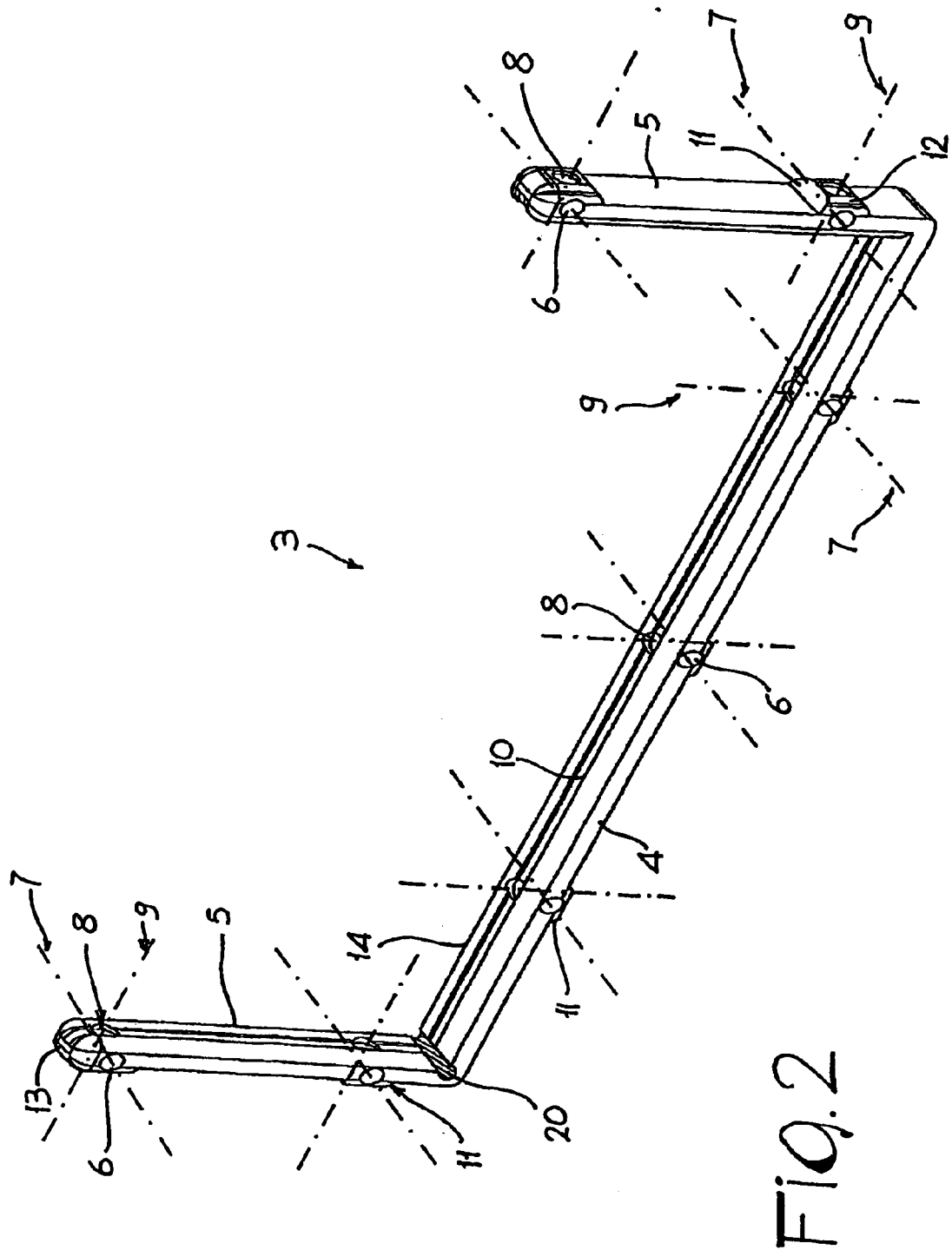
FIG. 2 is a perspective view illustrating a supporting module used in the duct according to the invention.

In particular, as illustrated in FIG. 2, the structural modules 3 have a basically U-shaped body, comprising a central wall 4 from which there project, on opposites sides with respect to one another, two side walls 5 set substantially parallel to one another, there being advantageously provided on said body coupling means designed to enable connection with the filiform elements 2.

Preferably, the means for coupling with the filiform elements 2 comprise a first series of through holes 6 (with axes 7 directed basically according to the longitudinal direction of the reference axis 100), which are designed to receive portions of the filiform elements 2. In addition, on the central wall 4 and/or on the two side walls 5 of the U-shaped body there is preferably provided a second series of assembly holes 8, which also are preferably through holes, operatively associated to the through holes, 6 of the first series. In the embodiment illustrated, the assembly holes 8 have axes 9 basically perpendicular to the axes 7, and are made so as each to be in communication with the respective through hole 6 associated thereto, for the purposes that will be specified more clearly in what follows.

Advantageously, on the U-shaped body of the structural modules 3 there are moreover provided means for coupling with further components that can be associated to the duct. In particular, the said means for coupling with further components that can be associated to the duct comprise at least one recessed seat 10 made along the central band of the internal surface of the central wall 4 and/or of the side walls 5. This recessed seat 10 enables direct and extremely simple coupling with accessory devices, for example rollers that will facilitate sliding of the cables along the duct during their laying in place, or else for housing clips, wherever necessary, for coupling between two consecutive ducts, or else yet again, for example, systems for hooking the harness of cables.

Preferably, in the embodiment of the duct according to the invention, the means for coupling with further components that can be associated to the duct comprise shaped protuberances 11, which are defined on the outer surfaces of the side walls 5 and/or of the central wall 4. Advantageously, these protuberances 11 are defined along the walls in a position corresponding to the pairs of through holes 6 and assembly holes 8 so as to constitute also a structural reinforcement in these points.

Figure 3:
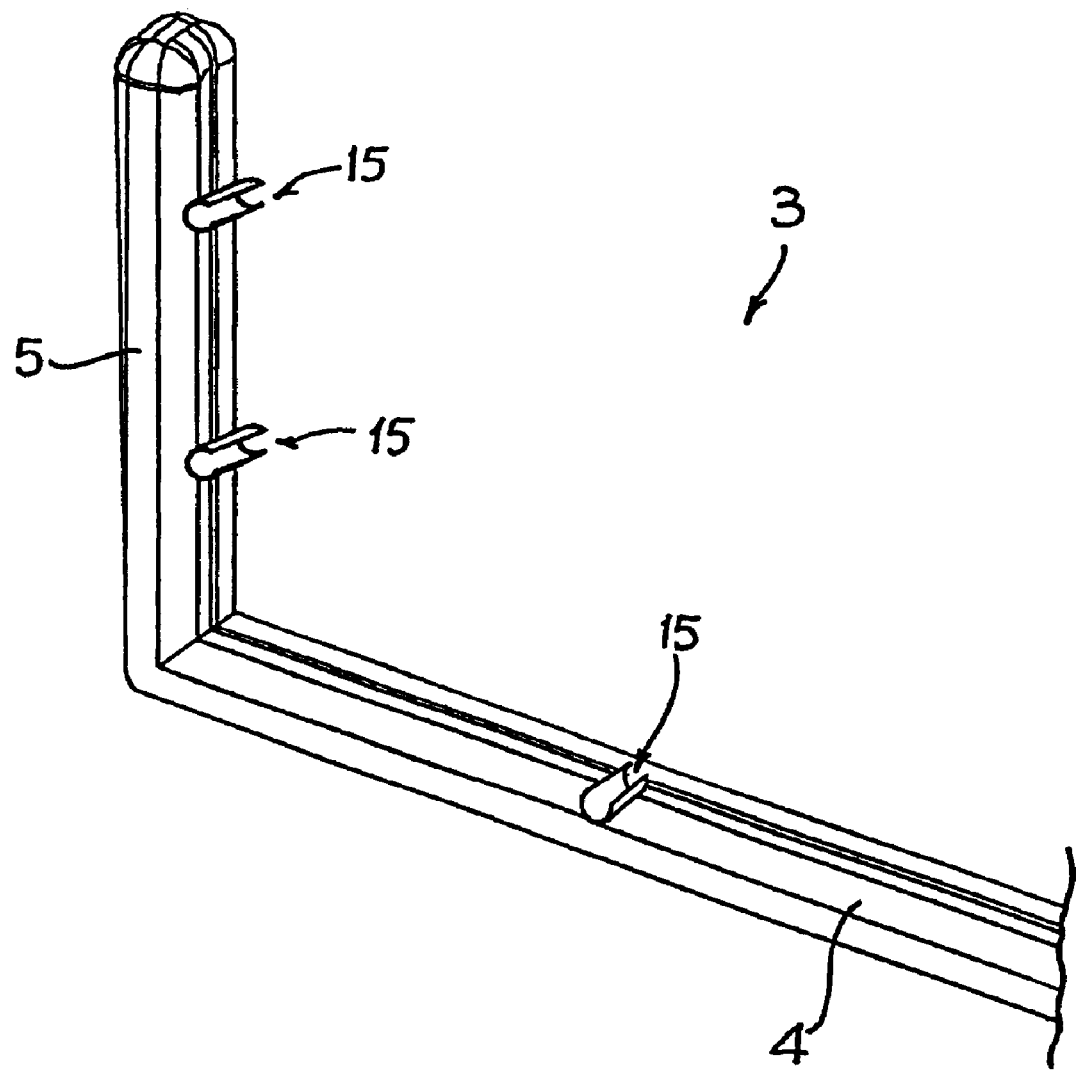
FIG. 3 is a partial perspective view schematically illustrating an alternative embodiment of a supporting module used in the duct according to the invention.

As illustrated in FIG. 3, on at least some protuberances 11 there is defined a pair of parallel grooves 12 with basically vertical axes.

In this way, the protuberances 11 constitutes surfaces for coupling with further components to be used together with the ducts, such as for example devices for hooking with other ducts to be arranged possibly alongside one another, or else means for hooking or resting on supporting surfaces, such as walls or floors and so forth in particular, the grooves 12 constitute rails in which there may be inserted, in an extremely simple way, parts accordingly conjugated of the components to be associated to the duct.

Furthermore, as illustrated in FIG. 2, the portions of free ends of the side walls 5 are advantageously configured so as to define, one or both, a shaped head 13, designed to favour direct coupling, for example snap-action coupling, with a closing element of the duct, for example a cover, hence without having to resort to additional adapting components and without any danger of damaging the cover itself.

Finally, at least the central wall 4 and/or also possibly the side walls 5 have internal edges 14 that are rounded so as to favour sliding of the cables along the path during laying in place.

Thanks to its innovative structure, the duct according to the invention, is suitable for being obtained according to different production modalities as required by the various needs.

In particular, according to a preferred embodiment, the supporting modules 3 are made in a single basically rigid piece of plastic material; alternatively, as schematically illustrated in FIG. 2, the structural modules 3 may be made in a single piece of plastic material with the side walls 5 which are movable and are hence provided with a certain freedom of movement with respect to the central wall 4. This mobility may be obtained by making flexural hinges directly in the structure of the structural module 3, only one of which hinges, for simplicity of exposition, is schematically illustrated in FIG. 2 and is designated by the reference number 20. Said hinges 20 are obtained by means of reduction of the thickness of a structural portion (hatched part in FIG. 2) in a position corresponding to the elbow between the central wall 4 and the side walls 5.

In this way, it is possible to exploit the flexibility of the side walls both to facilitate the steps of installation, seeking to exploit adequately the space available, and in the step of transportation, in which the ducts may be more easily stacked inside one another. It is even possible to make each structural module 3 with the side walls that may be displaced between a first resting position, for example in which the side walls 5 are completely extended and approximately aligned with the central wall 4, and a working position, in which the inclination of the side walls may be adjusted as desired until they form approximately right angles with the central wall 4. The ensemble may then be held in position by means of appropriate clamps or fasteners that can be applied externally, or with a system of hooking made directly in the structure of the walls, for example with projecting teeth or hooks that are then inserted in corresponding seats.

Alternatively, the structural modules 3 may be made of metal material, for example alloys such as Zn+Al+Mg alloy, by means of shear-bending.

In their turn, according to a preferred embodiment of the duct according to the invention, the filiform elements 2 are made using lengths of metal wire in which the free ends of each length are inserted within two through holes 6 belonging to two corresponding structural modules 3 arranged consecutively with respect to one another. Once inserted, the said ends of the lengths of metal 2 are connected to the structural modules 3 themselves. Preferably, the connection is obtained by means of appropriate tools, such as a punch that is: inserted within the assembly holes 8 and then upsets the ends, so that they remain slotted into the seats defined by the holes themselves. Alternatively, the ends of the lengths of filiform elements 2 may be bonded in the holes, or else it is possible to use other systems of connection, for example of the "plug-in" type.

In this way, the duct for cables 1 may be made according to a modular configuration, in which the successive addition of stretches of duct, constituted by pairs of structural modules 3 interconnected by lengths of filiform elements 2, enables the desired length to be obtained, either directly in the production stage, or during the phase of installation since the joining together of a number of stretches with the system just described proves extremely practical and convenient also at the installation site.

Alternatively, the duct for cables 1 may be made in a single co-extruded piece, or else by moulding directly the structural modules 3 directly onto the filiform elements 2, which in these cases would be used in the form of single bodies of appropriate length. With the above solutions, the final desired length of the duct may be obtained by joining a number of ducts one after another using simple connection devices, for example clips or fasteners that are inserted in the grooves 10 of two structural modules 3 arranged alongside one another, holding them joined together.

According to an alternative embodiment illustrated schematically in FIG. 3, the duct 1 according to the invention may be made using structural modules 3 in which the means for coupling with the filiform elements 2 are made, instead of with through holes 6, by means of appropriate means of engagement that comprise, for example, hooks 15 made of a single piece, such as the hook indicated in FIG. 3, or else in two half-parts. These hooks are preferably made directly in the body of the module, or applied externally, for example as metal inserts, and may be arranged in a position corresponding to the internal faces or also the external faces of said side walls 5 and/or central wall 4. In this embodiment, the filiform elements 2 are arranged, according to the longitudinal development of the duct, internally with respect to the hooks 15 that will keep them in position, coupled to the walls.

It has, in practice, been found that the duct according to the invention performs fully the task as well as the purposes set, providing significant advantages with respect to the known art. In fact, thanks to its innovative structure, and in particular thanks to the structural modules 3, the mechanical performance is as a whole clearly improved, and at the same time all the functional advantages typical of wire-mesh ducts are maintained. In addition, as described previously, the duct for cables 1 is suitable for being produced both according to a modular solution and to a monolithic solution, and using different methodologies of production according to the convenience of manufacture. Furthermore, the connection between the modules and the metal wires is obtained in a direct way, without for example having to resort to welding or additional systems of connection, and with solutions that prevent the need for the presence of ends of wires exposed that may cause cuts or damage. Considerable benefits are also achieved from the point of view of the costs of production and of laying in place, in that the number of components required is reduced with respect to the known art. In fact, for example, the coupling with a cover is obtained directly without any need for additional pieces, and likewise the construction of ducts of desired length may be obtained by joining together a number of stretches of duct without necessarily using hooking devices. Also coupling with possible accessories to be associated to the duct or construction of paths of desired length proves very simple, as also do configurations with ducts set alongside one another.

We claim:

1. A duct for electrical cables comprising a plurality of filiform elements arranged substantially parallel to one another according to the longitudinal development of the duct, wherein said duct comprises, for at least a portion of its length, a plurality of structural modules, which are arranged in a transverse direction with respect to said filiform elements and are spaced apart from one another in succession according to the longitudinal development of the duct, said structural modules having a basically U-shaped body that comprises a central wall from which there project, on opposites sides with respect to one another, two side walls set substantially parallel to one another, coupling means designed to enable connection with said filiform elements being arranged on said shaped body, wherein at least said central wall of the shaped body has rounded internal edges.

2. The duct according to claim 1, wherein said coupling means comprise a first series of through holes made in said shaped body, said through holes having their axes directed basically according to the longitudinal development of the duct and being designed to house portions of corresponding filiform elements.

3. The duct according to claim 2, wherein said shaped body there is provided a second series of assembly holes operatively associated to said first series of through holes, said second series of assembly holes having their axes perpendicular to the axes of the first series of through holes and being each set in communication with a corresponding hole of the first series.

4. The duct according to claim 1, wherein on said shaped body there are made coupling means with further components that can be associated to the duct.

5. The duct according to claim 4, wherein said means for coupling with further components that can be associated to the duct comprise a recessed seat made along the central band of the internal surface at least one of said central wall and side walls.

6. The duct according to claim 1, wherein the portions of free ends of said side walls are configured so as to define a shaped head for coupling with a closing element of the duct.

7. The duct according to claim 1, wherein said structural modules are made of a single basically rigid piece of plastic material.

8. The duct according to claim 1, wherein said structural modules are made of a single piece of plastic material with said side walls that are able to move with respect to the central wall due to hinges in the structural modules.

9. The duct according to claim 1, wherein said structural modules are made of a sheared and bent metal piece.

10. The duct according to claim 1, wherein said filiform metal elements comprise lengths of metal wire having their respective free ends housed in two through holes belonging to two corresponding consecutive structural modules.

11. The duct according to claim 1, wherein said duct is made of a single co-extruded piece or by moulding said supporting modules directly on said filiform metal elements.

12. The duct according to claim 1, wherein that said coupling means comprise a plurality of hooking means arranged on said shaped body, which are designed to couple directly with said filiform elements.

13. A duct for electrical cables comprising a plurality of filiform elements arranged substantially parallel to one another according to the longitudinal development of the duct, wherein said duct comprises, for at least a portion of its length, a plurality of structural modules, which are arranged in a transverse direction with respect to said filiform elements and are spaced apart from one another in succession according to the longitudinal development of the duct, said supporting structural modules having a basically U-shaped body that comprises a central wall from which there project, on opposites sides with respect to one another, two side walls set substantially parallel to one another, coupling means designed to enable connection with said filiform elements being arranged on said shaped body, wherein on said shaped body there are made coupling means with further components that can be associated to the duct, and wherein said means for coupling with further components that can be associated to the duct comprise shaped protuberances defined on the outer surfaces of at least one of said central wall and side walls.

14. The duct according to claim 13, wherein said shaped protuberances are defined on at least one of said central wall and side walls in positions corresponding to said first and second series of holes.

15. The duct according to claim 13, wherein, on at least some of said shaped protuberances, there is defined a pair of parallel grooves having basically vertical axes.

* * * * *